United States Patent
Krishna et al.

(10) Patent No.: US 8,028,056 B1
(45) Date of Patent: Sep. 27, 2011

(54) SERVER MONITORING FRAMEWORK

(75) Inventors: Ravi Krishna, Bangalore (IN); Vandana Shah, Karnataka (IN)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 12/633,296

(22) Filed: Dec. 8, 2009

Related U.S. Application Data

(62) Division of application No. 11/294,664, filed on Dec. 5, 2005, now Pat. No. 7,653,722.

(51) Int. Cl.
*G06F 15/16* (2006.01)
*G06F 12/00* (2006.01)

(52) U.S. Cl. ........................................ 709/223; 709/230

(58) Field of Classification Search .......... 709/223–229, 709/217–218, 250
See application file for complete search history.

(56) References Cited

U.S. PATENT DOCUMENTS

| | | | | |
|---|---|---|---|---|
| 6,108,648 | A * | 8/2000 | Lakshmi et al. ........................ | 1/1 |
| 6,128,644 | A * | 10/2000 | Nozaki ........................ | 709/203 |
| 6,941,341 | B2 * | 9/2005 | Logston et al. ................ | 709/203 |
| 7,143,159 | B1 * | 11/2006 | Grace et al. .................... | 709/224 |
| 2002/0076060 | A1 * | 6/2002 | Hall et al. ........................ | 381/74 |
| 2003/0002484 | A1 * | 1/2003 | Freedman ...................... | 370/352 |
| 2004/0236860 | A1 * | 11/2004 | Logston et al. ................ | 709/230 |
| 2005/0128946 | A1 * | 6/2005 | Murakami et al. ............. | 370/230 |
| 2006/0036989 | A1 * | 2/2006 | Chaudhuri et al. ............ | 717/101 |
| 2006/0236324 | A1 * | 10/2006 | Gissel et al. ................... | 718/105 |
| 2007/0088702 | A1 * | 4/2007 | Fridella et al. ................. | 707/10 |

OTHER PUBLICATIONS

Wahl et al., "Lightweight Directory Access Protocol (v3)", Request for Comments 2251, Dec. 1997, 40 pages.
Elson et al., "Internet Content Adaptation Protocol (ICAP)", Request for Comments 3507, Apr. 2003, 49 pages.
Rigney et al., "Remote Authentication Dial in User Service (RADIUS)", Request for Comments 2138, Apr. 1997, 65 pages.

* cited by examiner

*Primary Examiner* — Zarni Maung
(74) *Attorney, Agent, or Firm* — Cesari and McKenna, LLP

(57) ABSTRACT

A software framework configured to execute in a computer system and adapted to monitor statistics associated with one or more servers coupled to the computer system is disclosed. A data structure is configured to store statistics associated with the one or more servers coupled to the computer system. A server-monitoring thread is configured to update at least some of the statistics stored in the data structure, the server-monitoring thread to execute on a processor of the computer system. An application programming interface (API) responsive to a plurality of software modules executes in the computer system, the API is configured to process requests from the plurality of software modules for (i) adding or removing servers in the data structure or (ii) accessing statistics from the data structure. The computer system may be a network cache.

77 Claims, 8 Drawing Sheets

| SOFTWARE APPLICATION 412 | SERVER 414 | PROTOCOL TYPE 416 | TIMING INTERVAL (SECONDS) 418 | TCP RTT (SECONDS) 420 | PROTOCOL-SPECIFIC RTT (SECONDS) 422 | WEIGHT FCN 424 | WEIGHT METRIC 426 |
|---|---|---|---|---|---|---|---|
| 1 | 10.1.1.1 | HTTP | 2 | 10 | 12 | f(x,y) | 22 |
| 1 | 10.1.1.2 | HTTP | 2 | 17 | 7 | f(x,y) | 24 |
| 2 | 10.5.6.7 | ICAP | 1 | 5 | 11 | g(x,y) | 11 |
| ... | ... | ... | ... | ... | ... | ... | ... |

STATISTICS TABLE 400

SERVER MONITORING FRAMEWORK

RELATED APPLICATION

This application is a divisional of U.S. patent application Ser. No. 11/294,664, filed on Dec. 5, 2005 by Ravi Krishna et al., titled SERVER MONITORING FRAMEWORK, which is now issued as U.S. Pat. No. 7,653,722 on Jan. 26, 2010, which is hereby incorporated herein by reference.

FIELD OF THE INVENTION

The present invention generally relates to monitoring server statistics and, more specifically, to a novel framework through which multiple software modules can register servers to monitor and access statistical information associated with their registered servers.

BACKGROUND OF THE INVENTION

In general, a server may be configured to provide information to one or more clients according to a client/server model of information delivery. In this model, the server is a storage system that typically contains one or more mass storage devices, such as magnetic hard disks, in which information may be stored and retrieved as desired. The server is usually deployed over a computer network comprising a geographically distributed collection of interconnected communication links, such as Ethernet, optical or wireless links, that allow the clients to remotely access the server's stored information. The clients may include network devices or computers that are directly or indirectly attached to the server, e.g., via point-to-point links, shared local area networks (LAN), wide area networks (WAN) or virtual private networks (VPN) implemented over a public network such as the Internet.

In some client/server arrangements, the server may be configured as a network cache that buffers previously-accessed or frequently-accessed client information. As such, the server provides a set of clients with faster access to the buffered information than if they were to access the same information directly from the origin servers that normally serve the information. For instance, the set of clients may be physically situated closer to the network cache than to the origin servers, or the clients may be able to access the cache over a lower latency (or higher bandwidth) data path, etc. The network cache's buffered information is typically in the form of files which are made accessible to the set of clients.

In practice, the network cache can be configured to operate as a "reverse proxy" or "forward proxy" cache. A reverse-proxy cache is a server that stores a selected set of information from one or more origin servers. For example, a multimedia company may copy selected streaming audio or video content from its origin servers to a reverse-proxy cache, which is then used as an "accelerator" for providing the selected content to clients. In contrast, a forward-proxy cache is a server that buffers network data for a particular set of clients. Unlike the reverse-proxy cache, the forward-proxy cache does not necessarily store selected data from specific origin servers and instead may store data from a variety of different origin servers, i.e., based on the network traffic patterns of the cache's particular set of clients.

A reverse-proxy or forward-proxy cache may be coupled to one or more other servers in a computer network. In a conventional two-level cache hierarchy, clients communicate with "child" network caches, which are coupled to one or more higher-level "parent" caches, which in turn are coupled to one or more origin servers. A subset of the parent caches' files are stored in the child caches, and a subset of the origin servers' files are stored at the parent caches. The above-noted hierarchy may be generalized to various levels wherein each cache in the hierarchy is coupled to one or more higher-level proxy caches and/or origin servers. Network caches in such a hierarchical arrangement typically communicate with one another by exchanging discrete packets of data formatted according to predefined file-access protocols, such as the HyperText Transfer Protocol (HTTP), Network File System (NFS) protocol, Common Internet File System (CIFS) protocol, File Transfer Protocol (FTP), etc.

A network cache also may be coupled to other types of servers besides origin servers and higher-level proxy caches. For instance, the cache may be coupled to an authentication server, such as Remote Authentication Dial In User Service (RADIUS) server, that implements a predetermined authentication procedure. RADIUS and its associated protocol are generally described in more detail in the Request For Comments (RFC) 2138 entitled *Remote Authentication Dial In User Service (RADIUS)*, by Rigney et al., published April 1997, which publication is available through the Internet Engineering Task Force (IETF) and is hereby incorporated by reference as though fully set forth herein.

Yet other types of servers also may be coupled to the network cache. For instance, Lightweight Directory Access Protocol (LDAP) servers may provide directory services for the network cache, such as storing public-key certificates, email addresses, etc., whereas Internet Content Adaptation Protocol (ICAP) servers may provide object-based content vectoring services, such as virus scanning, content filtering and the like. The LDAP protocol is generally described in more detail in RFC 2251 entitled *Lightweight Directory Access Protocol (v3)*, by Wahl et al., published December 1997, and the ICAP protocol is described more in detail in RFC 3507 entitled *Internet Content Adaptation Protocol (ICAP)*, by Elson et al., published April 2003, and both of these publications are hereby incorporated by reference as though fully set forth herein.

Because the network cache can communicate with servers using many different types of network communication protocols, the cache generally executes a separate protocol-specific software module for each protocol type. As used herein, a software module may be a user-level or kernel-level process or thread. For example, each protocol-specific software module may be implemented as a kernel-level protocol engine that executes in the network cache. That is, the cache may include a HTTP protocol engine that is configured to communicate with higher-level proxy caches or origin servers using the HTTP protocol. Similarly, the cache may include RADIUS, LDAP and ICAP protocol engines that respectively communicate with remote RADIUS, LDAP, and ICAP servers.

Often, the network cache may be coupled to more than one server configured to communicate using the same network communication protocol. Each protocol engine in the network cache typically includes a mechanism for selecting an optimal, or "best available," server among multiple servers of the same protocol type. A protocol engine may select the optimal server based on various statistics associated with the servers, such as their available bandwidths, round-trip times or response times, and so forth. For example, if the cache is coupled to multiple RADIUS servers, the RADIUS-protocol engine may be configured to select an optimal RADIUS server for authenticating clients, e.g., based on which of the RADIUS servers has the shortest latency for response.

Each protocol engine typically includes server-monitoring code for collecting and storing server statistics, and selecting optimal servers of a given protocol type. For example, server-monitoring code in the HTTP protocol engine may be configured to collect and store the network cache's HTTP-server statistics in a first table, whereas server-monitoring code in the ICAP protocol engine may collect and store the cache's ICAP-server statistics in a second table. In this case, the HTTP protocol engine consults the contents of the first table to select an optimal HTTP server, and the ICAP protocol engine references the contents of the second table to select an optimal ICAP server. More generally, in the conventional case, every software module that is configured to monitor server statistics has to periodically query each of its monitored servers and then store its obtained server statistics in a local, protocol-specific statistics table, i.e., allocated for and managed by the software module.

The above-noted conventional approach to monitoring and selecting optimal protocol-specific servers suffers various disadvantages. First, each protocol engine contains a copy of substantially the same server-monitoring code, usually differing only in terms of which particular protocol is used to collect and store the server statistics. As a result, a large amount of server-monitoring code is usually replicated among the protocol engines in the network cache. Such code replication often causes the network cache to consume excessive processing and memory resources, e.g., storing and executing multiple versions of essentially the same server-monitoring code. For example, the conventional approach may consume excessive memory resources since each protocol engine allocates and maintains a separate statistics table for storing its collected server statistics.

In addition, since the protocol engines are typically implemented at the kernel level, i.e., within the operating system of the network cache, a problem with the server-monitoring code in one protocol engine may affect operations of other kernel-level processes in the operating system. For example, a software "bug" in one protocol engine's server-monitoring code could stall, interrupt or otherwise "crash" the operating system and require the entire system to be rebooted or the operating system to be recompiled. Accordingly, it is often difficult for an administrator of the network cache to manage and debug the multiple versions of server-monitoring code executing in the kernel-level protocol engines.

SUMMARY OF THE INVENTION

The present invention overcomes the disadvantages of the prior art by providing a software framework that monitors server statistics for a plurality of software modules and makes its collected statistics available to those modules. Unlike prior implementations in which each software module executes its own version of server-monitoring code, the novel framework provides shared server-monitoring code through which the plurality of software modules can monitor various types of servers, such as authentication servers, ICAP servers, origin servers, hierarchical proxy servers and so forth. Because the same server-monitoring code is accessed by each of the software modules, the overall amount of code that is written, compiled and executed may be reduced. Moreover, the shared server-monitoring code is not protocol-dependant and therefore may be coded outside of the kernel-level protocol engines. Preferably, the shared server-monitoring code is implemented as a user-level thread or process.

In accordance with an illustrative embodiment, the software framework includes a server-monitoring thread, a statistics table and an application programming interface (API). Each entry in the statistics table is configured to store statistics and other information associated with a different server. The server-monitoring thread collects server statistics and updates the contents of the statistics table. For example, the thread may periodically measure a connection-based round-trip time (RTT) or a protocol-specific RTT for a particular server. One or both of the server's measured RTT times may be input to a mathematical function that derives a "weight" metric representative of the relative availability of the server. Then, the thread may store the weight metric and measured RTT times at appropriate locations in the server's corresponding table entry in the statistics table. The timing interval that the server-monitoring thread uses to update the RTT times and weight metric may be predefined or user-configured, e.g., by a system administrator, and may differ from server to server.

The API provides a software interface that enables the plurality of software modules to (i) add or remove servers from the statistics table and (ii) access statistics and other information stored in the table. In the latter case, the API may provide selective filtering and searching services for accessing information in the statistics table. The API is responsive to a set of predetermined function calls, which may be customized for different operating environments. For instance, a software module may invoke an API function to add, or "register," one or more servers in the statistics table. Each of the module's registered servers is allocated a separate entry in the statistics table, and the contents of each entry is periodically updated by the server-monitoring thread. Later, the software module may invoke an API function to request which of the module's registered servers has the largest (or smallest) associated weight metric. Alternatively, the software module may request that the API return only those registered servers having weight metrics above (or below) a predetermined threshold value or within a specified range of weight-metric values.

Advantageously, the server-monitoring thread is not replicated for each software module as it is in previous implementations, and therefore can provide more efficient resource utilization and simplified code management. Preferably, the server-monitoring thread is a user-level thread that may be debugged or restarted without affecting the underlying operating system. The thread may be configured to collect various types of server statistics and other information for the software modules. Further, the thread also may be configured to combine at least some of its collected statistics in accordance with one or more mathematical weighting functions, e.g., predefined by a system administrator. Based on the outputs of the weighting functions, a preferred subset of the thread's monitored servers can be identified.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 4 is a schematic block diagram of an exemplary statistics table that may be used to store server statistics and other information in accordance with the illustrative embodiment;

DETAILED DESCRIPTION OF ILLUSTRATIVE EMBODIMENTS

Figure 1:
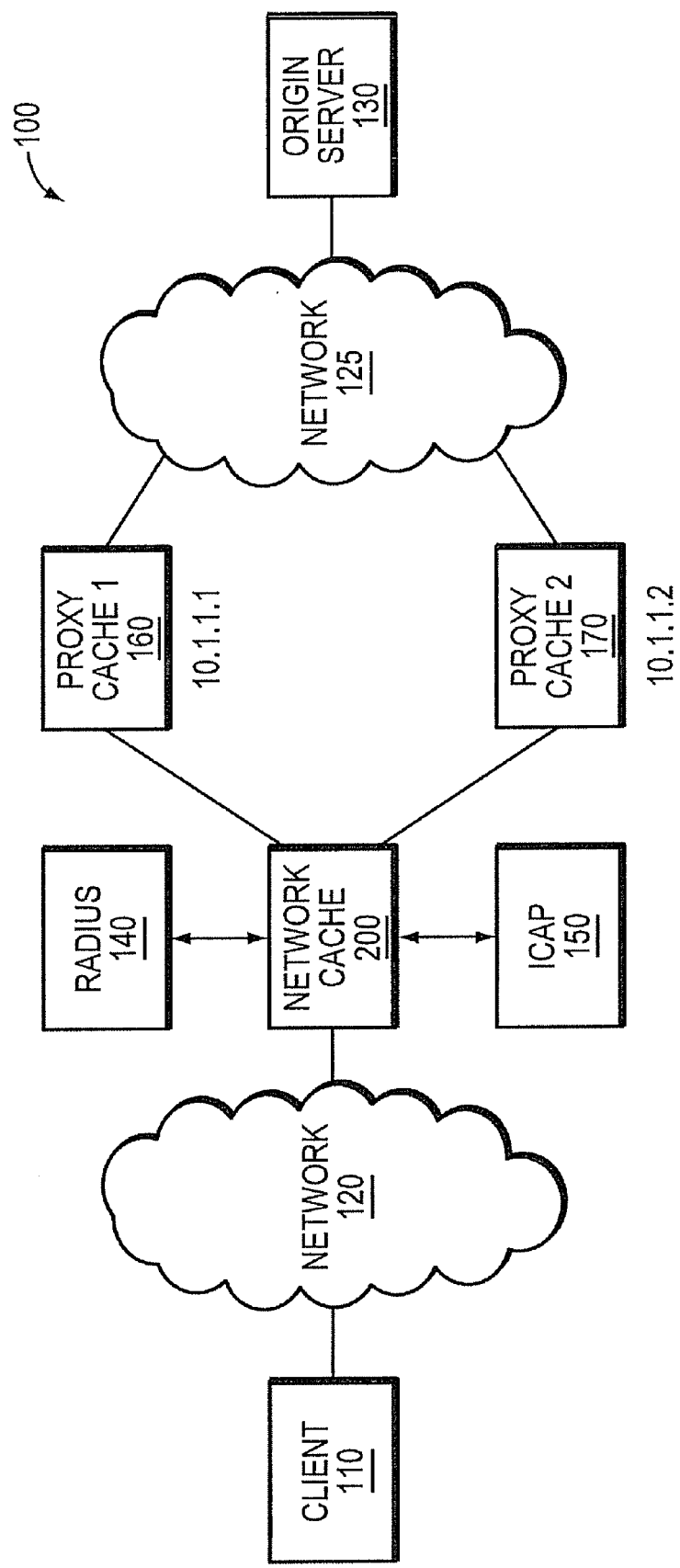
FIG. 1 is a schematic block diagram of an exemplary computer network in which an illustrative embodiment of the invention may be deployed.

FIG. 1 illustrates an exemplary computer network 100 in which an illustrative embodiment of the invention may be deployed. The network includes at least one client 110 that is coupled to a network cache 200, e.g., through a network 120. In other embodiments, the client may be directly connected to the network cache. The cache 200 may be configured to operate in a forward or reverse proxy mode, and provides the client with faster access to a set of data objects, such as files, than if the client were to access those objects directly from an origin server 130, e.g., connected to the network 125.

The exemplary network 100 is arranged as a two-level cache hierarchy in which the network cache 200 stores a subset of the files contained in the higher-level proxy caches 160 and 170, respectively labeled "proxy cache 1" and "proxy cache 2." The higher-level proxy caches, in turn, store a subset of the files available in the origin server 130. Besides the proxy caches 160 and 170, the network cache 200 may be coupled to one or more other servers including, for example, a RADIUS server 140 and an ICAP server 150. Of course, those skilled in the art will appreciate that the cache 200 also may be coupled to, e.g., LDAP servers, origin servers, other RADIUS or ICAP servers, proxy servers, etc., in addition to or in place of the servers 140-170 explicitly depicted in the network 100.

The network cache 200 communicates with the client 110 and its neighboring servers 140-170 using one or more network communication protocols. For instance, the cache may exchange data with the client and higher-level proxy caches using the HTTP protocol, and may communicate with the RADIUS and ICAP servers using the RADIUS and ICAP protocols, respectively. The network cache transmits and receives data as protocol data units (PDU) which are formatted according to specific network communication protocols. The cache typically transmits the PDUs over a reliable transport protocol, such as the conventional Transmission Control Protocol (TCP).

In practice, the client 110 may send a request to the network cache 200 to access a particular file. The cache analyzes the received request to determine whether it contains a local copy of the client-requested file. If so, the cache returns its local copy of the requested file to the client. However, if the client-requested file is not already resident in the cache 200, the cache may be configured to forward the client request to one of the higher-level proxy caches 160 or 170. If the higher-level proxy cache determines that it contains a local copy of the client-requested file, then a response containing the requested file is returned to the network cache 200, which then may store a local copy of the file before forwarding the file to the requesting client 110. However, if a copy of the requested file is not resident in the higher-level proxy cache, the higher-level proxy cache requests the file from the origin server 130. Thereafter, the origin server retrieves the requested file from its data storage and the file is forwarded in a "downstream" direction from the origin server to the higher-level cache to the network cache and eventually to the client 110. In this case, both the network cache and the higher-level proxy cache may store local copies of the client-requested file.

When the network cache 200 is coupled to multiple servers of the same protocol type, the cache may have to select which of the servers to forward PDUs of that protocol type. For instance, consider the exemplary cache 200 which is coupled to two different HTTP-based proxy caches 160 and 170. Suppose that a client-requested file is not locally available at the network cache 200, and thus the cache needs to request the file from at least one of the higher-level proxy caches 160 or 170. The network cache may be configured to select an "optimal" one of the higher-level caches, e.g., based on one or more server statistics associated with the proxy caches 160 and 170. After selecting an optimal higher-level proxy cache, the network cache 200 may forward a HTTP request to the selected cache in order to retrieve the client's requested file.

In accordance with an illustrative embodiment of the invention, the network cache 200 employs a novel software framework that enables it to select an optimal server from a plurality of servers of the same protocol type. To that end, the software framework monitors statistics corresponding to various servers coupled to the network cache and makes its collected statistics available to protocol engines executing in the cache. The protocol engines can select optimal servers associated with their respective protocols based on the statistics collected by the software framework. Advantageously, unlike prior implementations where each protocol engine executes a separate set of server-monitoring code for collecting server statistics, the novel framework instead provides a single set of server-monitoring code for each of the protocol engines. Consequently, the overall amount of code that is written, compiled and executed in the network cache may be reduced. Moreover, the shared server-monitoring code is not protocol-dependant and therefore may be coded outside of the kernel-level protocol engines. The shared server-monitoring code is preferably implemented as a user-level thread and is also preferably started at system bootup time. As such, the user-level server-monitoring thread may be debugged or restarted without affecting the underlying operating system or other threads and processes.

The novel software framework may be used to monitor servers in various network configurations, including but not limited to the topology illustratively depicted in the exemplary computer network 100. For example, rather than collect server statistics for multiple ICAP, RADIUS or hierarchical proxy servers, the network cache 200 instead may be configured as a reverse-proxy cache that collects server statistics associated with a plurality of origin servers 130. In this scenario, the reverse-proxy cache collects server statistics associated with each of the origin servers that it accelerates. The cache can use its collected statistics to determine a preferred origin server 130 from which it can retrieve client-requested information.

Figure 2:
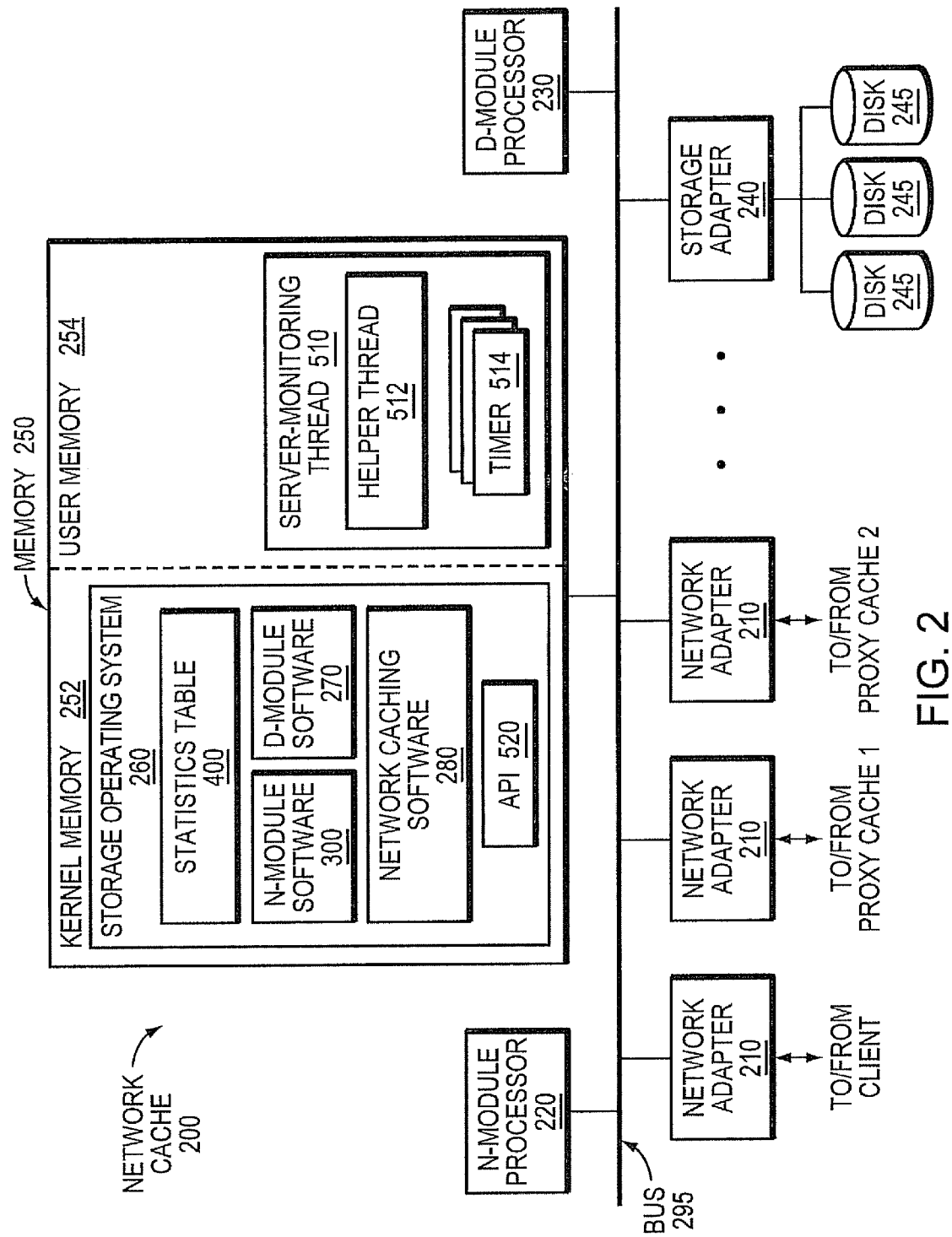
FIG. 2 is a schematic block diagram of an exemplary network cache that advantageously may implement the illustrative embodiment of the invention.

FIG. 2 is a schematic block diagram of the exemplary network cache 200. The network cache comprises, among other things, one or more network interfaces 210, a network ("N-module") processor 220, a data ("D-module") processor 230, a storage adapter 240 and a memory 250 interconnected by a system bus 295. Each network interface 210 includes the mechanical, electrical and signaling circuitry for sending and receiving data packets to/from other computers connected to the network cache 200, e.g., over Ethernet links, optical links, wireless links, etc. Each interface 210 may contain specialized processing elements, such as logic or processors, that format in-coming and out-going data packets consistent with predetermined network communication protocols. For example, a first network interface 210 may be configured to exchange HTTP messages with the client 110, and additional network interfaces may be configured to communicate HTTP messages with the proxy caches 160 and 170.

The storage adapter 240 interfaces with one or more mass storage devices 245. Each mass storage device may be embodied as any type of writable storage device, such as a magnetic or optical disk drive, a non-volatile random access memory (e.g., FLASH memory), a magnetic or optical tape drive, an erasable programmable read-only memory (EPROM) or any other form of mass storage device. Preferably, the storage devices are deployed as an array of storage disks 245. The disks may be arranged as a Redundant Array of Independent Disks (RAID) group so that some disks store striped data and at least one disk stores separate parity data for the group, e.g., in accordance with a conventional RAID-4 configuration. However, other configurations (e.g. RAID-5 having distributed parity across stripes) are also contemplated.

The storage adapter 240 is configured to store and retrieve a set of data objects, such as files, from the disks 245. The storage adapter includes input/output (I/O) interface logic and circuitry that couples the disks to the adapter over an I/O interconnect arrangement, such as a conventional Fibre-channel serial link topology. A client-requested file may be retrieved by the storage adapter 240 and, if necessary, processed by the N-module and D-module processors 220 and 230 (or the storage adapter itself) prior to being forwarded over the system bus 295 to an appropriate network adapter 210. The file is formatted into a response that is transmitted from the network adapter to the requesting client 110.

The memory 250 comprises storage locations that are addressable by the processors 220, 230 and adapters 210, 240 for storing program code and data. The memory preferably comprises a form of random access memory (RAM) that is generally cleared by a power cycle or other reboot operation (e.g., it is a "volatile" memory). The processors and adapters comprise processing elements, logic and/or circuitry configured to execute the software code and manipulate the data stored in the memory 250. It will be apparent to those skilled in the art that various types of memory means, including computer-readable media and electromagnetic signals, may be used for storing program instructions pertaining to the inventive technique described herein.

The memory 250 may be logically organized to include a kernel memory 252 and a user memory 254. The kernel and user memories may be embodied as different memory regions in a shared memory 250, or alternatively may be logically and/or physically differentiated as known in the art. The kernel memory 252 is configured to store kernel-level threads, processes and related data structures, whereas the user memory is configured to store user-level threads, processes and related data structures. In accordance with the illustrative embodiments, the kernel memory 252 is configured to store, among other things, a storage operating system 260 including a statistics table 400, N-module software 300, D-module software 270, network-caching software 280 and an application programming interface (API) 520. Further to the illustrative embodiments, the user memory is configured to store, among other things, a user-level server-monitoring thread 510.

The storage operating system 260, portions of which are typically resident in the memory 260 and executed by the N-module and D-module processors 220 and 230, functionally organizes the network cache 200 by, inter alia, invoking storage operations in support of the storage services provided by the cache. The storage operating system includes a set of core services, such as file system semantics, disk I/O operations, memory management and the like. For example, the storage operating system may include N-module software 300 that defines a set of software layers (i.e., a network protocol stack) for formatting and processing data packets sent and received at the network interfaces 210. Similarly, the operating system may include D-module software 270 for performing file-system semantics and RAID-related operations.

Although the N-module software is preferably executed by the N-module processor, and the D-module software is preferably executed by the D-module processor, those skilled in the art will appreciate that other hardware configurations are possible. For instance, the processors 220 and 230 may be configured to execute portions of both the N-module and D-module software, or a single processor may be employed, and so forth. The storage operating system is preferably implemented as the NetApp® Data ONTAP™ operating system available from Network Appliance, Inc. of Sunnyvale, Calif. However, it is expressly contemplated that other storage operating systems may be used in accordance with the inventive principles described herein.

The storage operating system 260 includes network caching software 280 that functionally invokes proxy-caching operations for storing and retrieving files from the memory 250 and storage disks 245. The caching software is further configured to cooperate with remote servers to retrieve those client-requested files that are not stored locally in the cache 200. The network caching software 280 may be embodied within a version of the NetCache™ software module developed by Network Appliance, Inc. of Sunnyvale, Calif. or in any other similar software module that is used to manage proxy-caching operations. Although the network caching software is preferably directly incorporated into the storage operating system 260, it alternatively may be implemented as a separate user process, i.e., outside of the operating system ("kernel").

In accordance with the illustrative embodiment, the network cache 200 implements a novel software framework including, inter alia, the statistics table 400, server-monitoring thread 510 and API 520. The statistics table 400 is configured to store server statistics and other information associated with a set of servers coupled to the network cache 200. The statistics table may be stored at a predetermined location in the memory 250 and its contents may be made available to both kernel-level and user-level threads and processes.

Advantageously, the statistics table 400 is preferably located in the kernel memory 252 in order to facilitate faster access to the table by kernel-level software modules, such as the network-caching software 280. Accordingly, by storing the table 400 in the kernel memory, the kernel-level software modules can quickly access the table without having to perform a context switch out of kernel-memory space. Although this illustrative embodiment requires the user-level server-monitoring thread 510 to perform a context switch whenever it accesses the statistics table 400, it is expected that the server-monitoring thread accesses the table less frequently than do the kernel-level software modules, which may access the table once per client request. Consequently, an improvement in access latency can be achieved by eliminating context switching for the more common case of kernel-level accesses to the statistics table 400.

The server-monitoring thread 510 collects server statistics and updates the contents of the statistics table 400. Preferably, the thread is a user-level thread that is executed by the N-module processor 220. Further, the server-monitoring thread is preferably started at system bootup time. The server-monitoring thread 510 may implement a separate timer 514 for each server that it monitors in order to determine when it is time to update that server's statistics. When a timer 514 expires, the server-monitoring thread may invoke a "helper" thread 512 that collects server statistics for the timer's associated server and then updates the statistics table 400 based on the newly-collected statistics. The timing intervals of the timers 514 may be predefined or user-configured, e.g., by a system administrator, and may differ from server to server.

The API 520 provides a kernel-level interface through which a plurality of software modules can (i) add or remove servers from the statistics table and (ii) access statistics and other information stored in the table. In the latter case, the API 520 may provide selective filtering and searching services for accessing information in the statistics table 400. The API is responsive to a set of predetermined function calls, which may be customized for different operating environments. By way of example, a software module may invoke an API function to add, or "register," one or more servers in the statistics table. Each of the module's registered servers is allocated a separate entry in the statistics table 400, and the contents of each entry is periodically updated by the server-monitoring thread 510. Later, the software module may invoke an API function to retrieve statistical information or other information associated with its registered servers. For instance, the software module may request that the API search the statistics table to identify which of the module's registered servers is associated with statistical information satisfying certain search criteria, e.g., from which the software module can select an optimal server.

Figure 3:
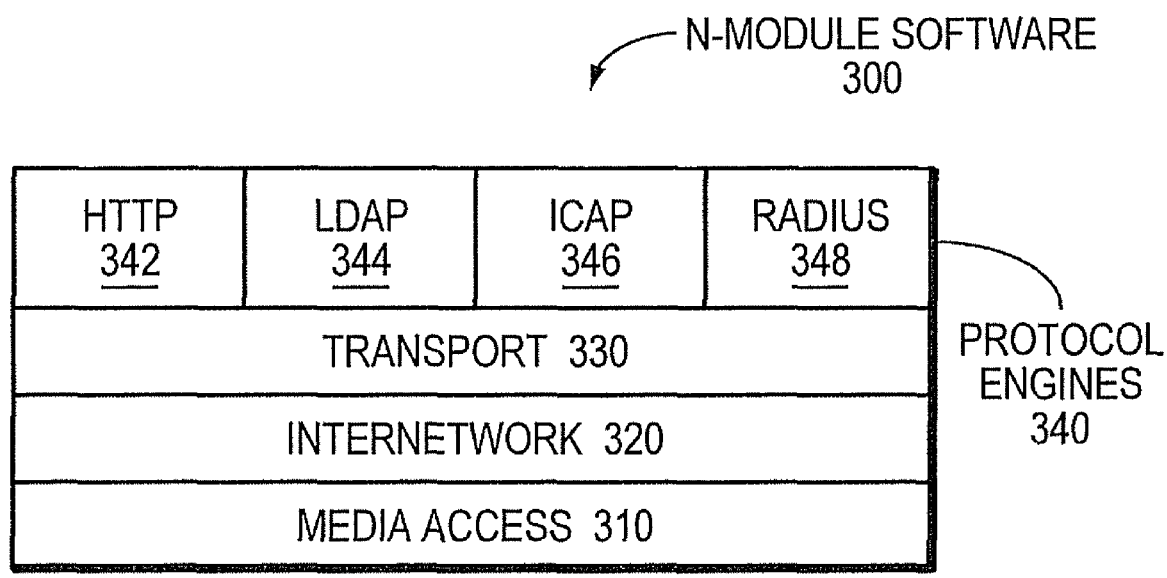
FIG. 3 is a schematic block diagram of network software that may be executed by the network cache of FIG. 2.

FIG. 3 is a schematic block diagram of the exemplary N-module software 300 that may be implemented in the storage operating system 260. The N-module software is logically implemented as a network protocol stack having four software layers termed, in ascending interfacing order, the media access layer 310, the internetwork layer 320, the transport layer 330 and the protocols-engines layer 340. The media access layer 310 is generally standardized and implemented in hardware and firmware, whereas the higher layers are typically implemented in the form of software. The media access layer is configured to format data packets sent or received over the network interfaces 210. Thus, the media access layer may be compatible with packet, frame and cell formats used for trans-porting data over various types of physical media, including Ethernet links, optical links, wireless links, etc.

The internetwork layer 320 typically implements a version of the Internet Protocol (IP), which is primarily a connection-less protocol that provides internetwork routing, fragmentation and assembly of data packets. The IP protocol generally relies on transport protocols for end-to-end reliability and other service characteristics. The transport layer 330 implements the transport protocols, such as the TCP protocol, that provide connection-oriented, end-to-end reliability services to the upper layer protocols of the network protocol stack. The protocol engines 340 implement various network communication protocols that process packet data received from the lower levels of the network protocol stack. The protocol engines may be implemented as software modules that are configured to process data packets formatted in accordance with, for example, the HTTP protocol 342, LDAP protocol 344, ICAP protocol 346, RADIUS protocol 348 and/or other protocols not explicitly shown. After processing a particular request or response, a protocol engine may send the processed request or response back to the lower layers of the protocol stack for transmission to an intended recipient.

FIG. 4 illustrates the exemplary statistics table 400 in more detail. Unlike prior implementations where each software module manages its own statistics table, the table 400 is configured to store server statistics for a plurality of different software modules. In order to coordinate access to the statistics table 400 among the plurality of software modules, a system of read and write locks may be employed. For instance, multiple read locks may be concurrently issued to the software modules so as to allow different software modules to read the contents of the statistics table at substantially the same time. However, write locks may be issued in a manner that ensures that only one software module can modify the table at a time.

The statistics table 400 includes a plurality of table entries 410, each corresponding to a different server to be monitored by the server-monitoring thread 510. Each table entry is configured to store, among other things, a software-module identifier 412, a server identifier 414, a protocol type 416, a timing interval 418, a TCP round-trip time (RTT) 420, a protocol-specific RTT 422, a weight function 424 and a weight metric 426. Those skilled in the art will appreciate that other information, besides the fields 412-426 explicitly depicted, also may be stored in the statistics table 400.

The software-module identifier 412 is a value that uniquely identifies which particular software module registered the server identified by the server identifier 414. The identifier 412 alternatively may denote a particular user who registered the server through a software module. Software-module identifier values may be statically assigned to various software modules and/or users, e.g., by a system administrator, or may be dynamically assigned, e.g., by the API 520 through which the software modules and users register (add) servers to the table 400. The server identifier 414 is a value, such as an IP address, that uniquely identifies a particular server coupled to the network cache 200. The protocol type 416 is a value that indicates which network communication protocol should be used to monitor the server 414.

Referring again to FIG. 1, suppose that the proxy cache 160 is assigned an IP address 10.1.1.1 and the proxy cache 170 is assigned an IP address 10.1.1.2. Further assume that the HTTP protocol engine 342 is associated with a software-module identifier value equal to "1," e.g., assigned by the API 520. Accordingly, if the HTTP engine 342 registers both of the HTTP-based proxy caches 160 and 170 in the statistics table 400, separate table entries 410a and 410b may be allocated for each of these proxy caches. The exemplary statistics table 400 also may include entries corresponding to servers registered by other software modules or users. For instance, the table entry 410c indicates that an ICAP server 150 assigned to an IP address equal to 10.5.6.7 was registered by the ICAP protocol engine 346 having a software-module identifier value equal to "2."

The timing interval 418 indicates how often the server-monitoring thread 510 updates the contents of the table entry 410. The value of the timing interval 418 may be predefined or user-configured, e.g., by a system administrator. As shown, the timing intervals 418 stored in the exemplary table entries 410a and 410b indicate that server statistics associated with the proxy caches 160 and 170 are updated once every two seconds. In contrast, the timing interval stored in the table entry 410c indicates that server statistics associated with the ICAP server 150 are updated once every second. The server-monitoring thread 510 preferably implements a separate timer 514 for each table entry 410 (i.e., a separate timer for each registered server 414), and the duration of a table entry's timer is preferably set equal to the entry's timing interval 418.

In the illustrative embodiment, each table entry 410 is configured to store a TCP RTT 420 and a protocol-specific RTT 422. More generally, the table entries may be configured to store any type of server statistics. The TCP RTT 420 indicates the responsiveness of a TCP connection between the network cache 200 and the server 414. In operation, when a table entry's associated timer 514 expires, the server-monitoring thread 510 sends a TCP synchronization (SYN) packet to the server identified by the table entry's server identifier 414. The server-monitoring thread measures the TCP RTT 420 as the amount of time elapsed, e.g., in seconds, from the time the TCP SYN packet was transmitted until a corresponding TCP acknowledgment (ACK) message is received at the network cache 200. Preferably, if the measured TCP RTT 420 is greater than a predetermined threshold value, then the TCP session is determined to be inoperative and currently unavailable. In this situation, the value of the TCP RTT 420 may be left unchanged or set to a predefined value, e.g., equal to zero.

Assuming the measured TCP RTT 420 is less than or equal to the predetermined threshold value, the server-monitoring thread 510 subsequently measures a protocol-specific RTT 422 for the server 414. The protocol-specific RTT indicates the responsiveness of communicating with the server using the protocol identified by the protocol type 416. More specifically, the server-monitoring thread measures the protocol-specific RTT as the amount of time that it takes for the server 414 to respond to a protocol-specific message. For example, if the protocol type 416 corresponds to the HTTP protocol, the protocol-specific RTT 422 may be measured as the amount of time it takes for an HTTP server 414 to respond to a conventional HTTP GET message.

In some cases, the protocol type 416 may correspond to a "custom" protocol, i.e., that does not coincide with a standard network communication protocol. If the protocol type is custom, then the table entry 410 also may include an additional "monitoring function" field (not shown) that identifies a particular monitoring function that should be used for measuring the protocol-specific RTT 422. The monitoring-function field may store a memory-address pointer to a block of monitoring-function code, e.g., stored in the memory 250, that measures the protocol-specific RTT in accordance with the custom protocol type.

The weight function 424 identifies a predetermined mathematical function which may be used to calculate the weight metric 426. The weight function may be stored in the table entry as a memory-address pointer to function code, e.g., stored in the memory 250, that implements the mathematical function. The weight metric 426 is a value that represents a relative preference level (or "rank") that characterizes the relative desirability of communicating with the server 414. Preferably, the weight metric is a measure of the relative ease with which the network cache 200 can communicate with the server 414. In the illustrative embodiment, one or both of the measured RTT values 420 and 422 may be input to the weight function 424, which then outputs the calculated weight metric 426.

Consider the weight function $f(x, y)=x+y$, where x equals the TCP RTT 420 and y equals the protocol-specific RTT 422. In this case, the weight function $f(x, y)$ calculates a weight metric 426 based on the sum of a server's TCP and protocol-specific RTT measurements 420 and 422. Next, consider the weight function $g(x, y)=y$, where y is the protocol-specific RTT 422. Unlike the function $f(x, y)$, the weight function $g(x, y)$ calculates a weight metric based solely on the value of the server's protocol-specific RTT. As shown in the exemplary table entries 410a and 410b, the weight function $f(x, y)$ is used to calculate the weight metrics 426 for the HTTP-based proxy caches 160 and 170; the table entry 410c indicates that the weight function $g(x, y)$ is used to calculate the weight metric of the ICAP server 150. Those skilled in the art will appreciate that the functions $f(x, y)$ and $g(x, y)$ are merely illustrative and any weight function 424 may be employed to calculate the weight metrics 426 in accordance with the present invention.

Figure 5:
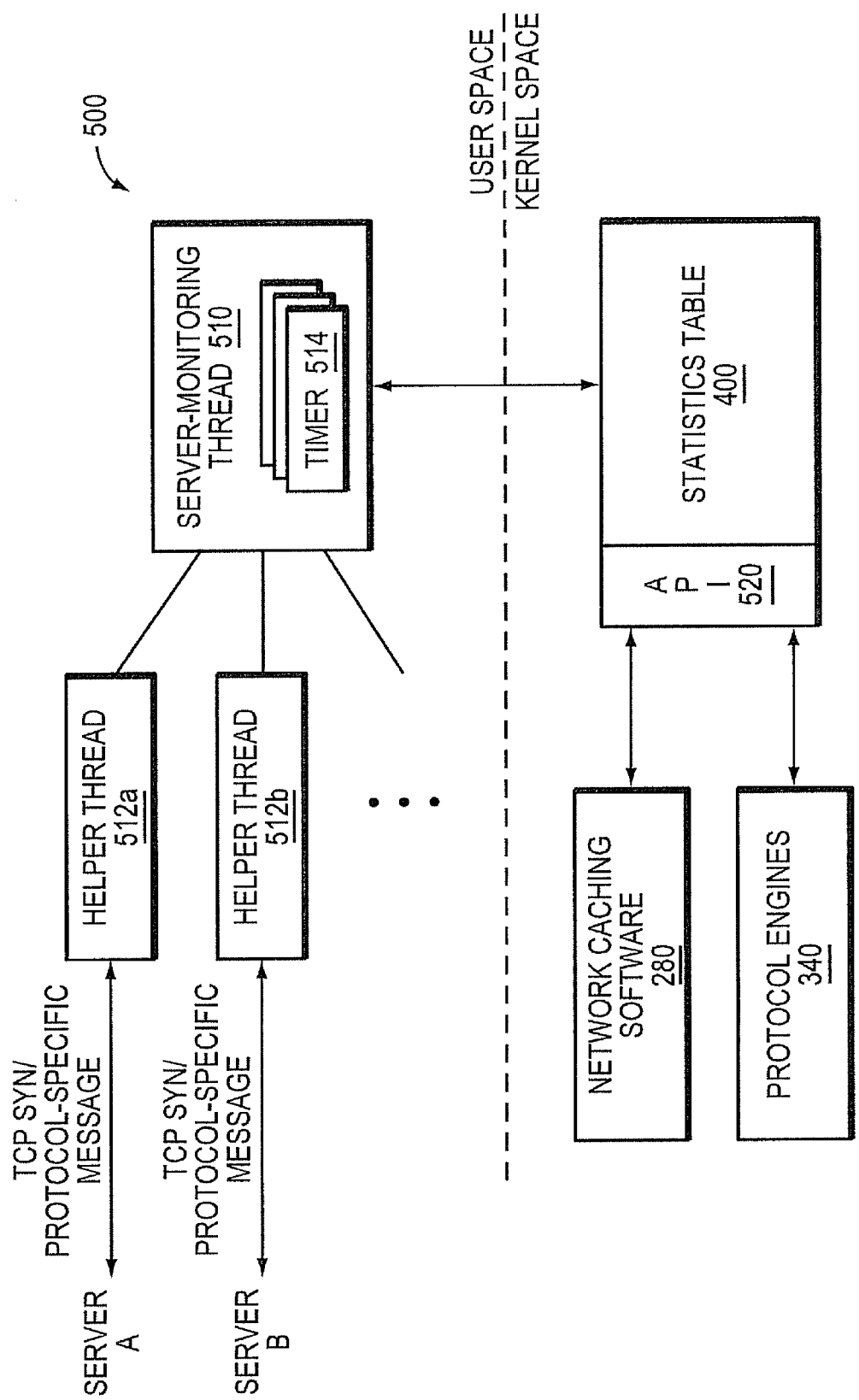
FIG. 5 is a schematic block diagram of the novel software framework deployed in accordance with the illustrative embodiment.

FIG. 5 illustrates a functional block diagram of the novel software framework 500. As noted, the framework 500 includes the statistics table 400, server-monitoring thread 510 and API 520. The kernel-level network caching software 280 and protocol engines 340 can access the contents of the statistics table 400 via the API 520. The network caching software and protocol engines preferably send API function calls directly to the API. A system administrator or other user may interact with the network caching software, e.g., by a command-line interface (CLI) or graphical-user interface (GUI), to register one or more servers in the statistics table 400 and access server statistics from the table. The caching software, in turn, may reformat the administrator's commands as API function calls which are sent to the API 520 for processing.

The API 520 may receive a "register_monitor" function call that requests the API to register (add) one or more servers in the statistics table 400. In response to receiving the register_monitor function call, the API allocates a separate table entry 410 for each newly-registered server. The register_monitor function call may specify one or more arguments including, for example, a server identifier 414, protocol type 416, timing interval 418, weight function 424 and monitoring function, if necessary. Other information, not explicitly specified in the function call, may be determined by the API 520. For example, the API may allocate a software-module identifier 412 corresponding to which particular user or software module sent the register_monitor function call to the API.

The network caching software 280, protocol engines 340 or other software module may send the API 520 one or more function calls to retrieve statistical information or other information from the statistics table 400. For instance, a software module may send a "get_weight" function call to request that the API 520 return the weight metric 426 of a particular server. In response to receiving the get_weight function call, the API 520 searches the statistics table 400 to locate a table entry 410 containing both the requesting software module's identifier 412 and a server identifier 414 corresponding to the server specified in the get_weight function call. After locating this "matching" table entry, the API returns the entry's weight metric 426 to the requesting software module. The software module also may send the API 520 a "get_best_weight" function call that requests the API to identity of which of the module's registered servers 414 has the largest (or smallest) weight metric 426. Yet another API function call may request that the API return only those registered servers 414 having weight metrics 426 above (or below) a predetermined threshold value or within a specified range of weight-metric values.

The server-monitoring thread 510 is preferably a user-level thread, i.e., not compiled into the operating system. The thread 510 allocates a separate timer 514 for each table entry 410 in the statistics table 400. When a table-entry timer expires, the server-monitoring thread 510 creates a helper thread 512 that queries the server identified by the table entry's server identifier 414 and measures the table entry's TCP and protocol-specific RTT values 420 and 422. To effectuate these measurements, the helper thread 512 sends a TCP SYN packet and/or a protocol-specific message to the server 414 and measures the latency (RTT) for response. The helper thread inputs its TCP and/or protocol-specific RTT measurements into the table entry's identified weight function 424, which calculates an updated weight metric 426. The helper thread stores the calculated weight metric 426 in the expired timer's associated table entry 410. After storing the weight metric, the helper thread is preferably de-allocated. Alternatively, rather than de-allocating the helper thread 512 after it has finished updating the contents of the table entry 410, the helper thread instead may be rendered inactive until the table-entry timer 514 expires again.

Because more than one timer 514 may expire before the helper thread 512 has finished measuring the TCP and protocol-specific RTT values and updating the contents of the table entry 410, multiple helper threads may be instantiated concurrently. For example, as shown in FIG. 5, a first helper thread 512a may be in communication with a server A at substantially the same time as a second helper thread 512b communicates with a different server B. A conventional lock manager (not shown) may be implemented by the server-monitoring thread 510 to manage lock contention among the helper threads 512a,b as they concurrently update their respective table entries 410. In a preferred embodiment, the storage operating system 260 includes an API, different from the novel API 520, which is configured to issue read and write locks to multiple helper threads 512 as they concurrently update the contents of different table entries 410 in the statistics table 400.

Figure 6:
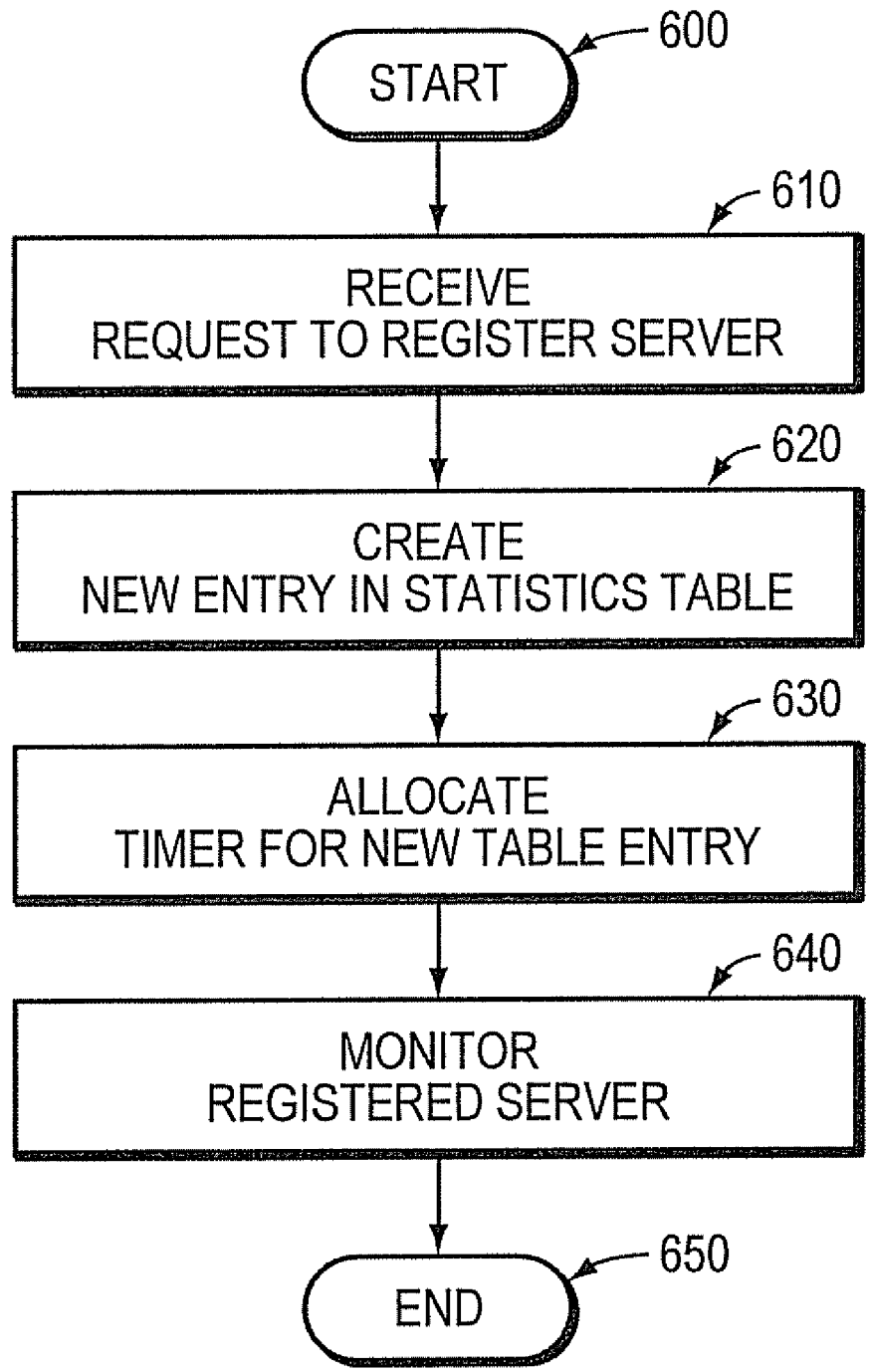
FIG. 6 is a flowchart illustrating a sequence of steps that may be performed for registering servers in accordance with the illustrative embodiment.

FIG. 6 illustrates a sequence of steps that may be performed for registering servers in the statistics table 400. The sequence starts at step 600 and proceeds to step 610 where a software module, such as a protocol engine 340, sends the API 520 a request to register one or more servers in the statistics table. The received request may be formatted as a register_monitor API function call that can be parsed by the API. Preferably, the request identifies a server identifier 414, protocol type 416, timing interval 418, weight function 424 and, if necessary, a monitoring function, for each server to be registered.

At step 620, the API creates a new table entry 410 in the statistics table for each server 414 identified in the received request. For each new table entry, the API stores a software-module identifier 412 as well as the received server identifier, protocol type, timing interval, weight function and monitoring function. The API may have to allocate the software-module identifier for the requesting software module, if one was not previously allocated. At step 630, the API 520 or server-monitoring thread 510 allocates a table-entry timer 514 for each new table entry 410. Thereafter, at step 640, the newly registered servers are monitored by the server-monitoring thread. Specifically, the thread periodically updates server statistics and other information stored in each table entry, e.g., in response to the table entry's timer 514 expiring. The sequence ends at step 650.

Figure 7:
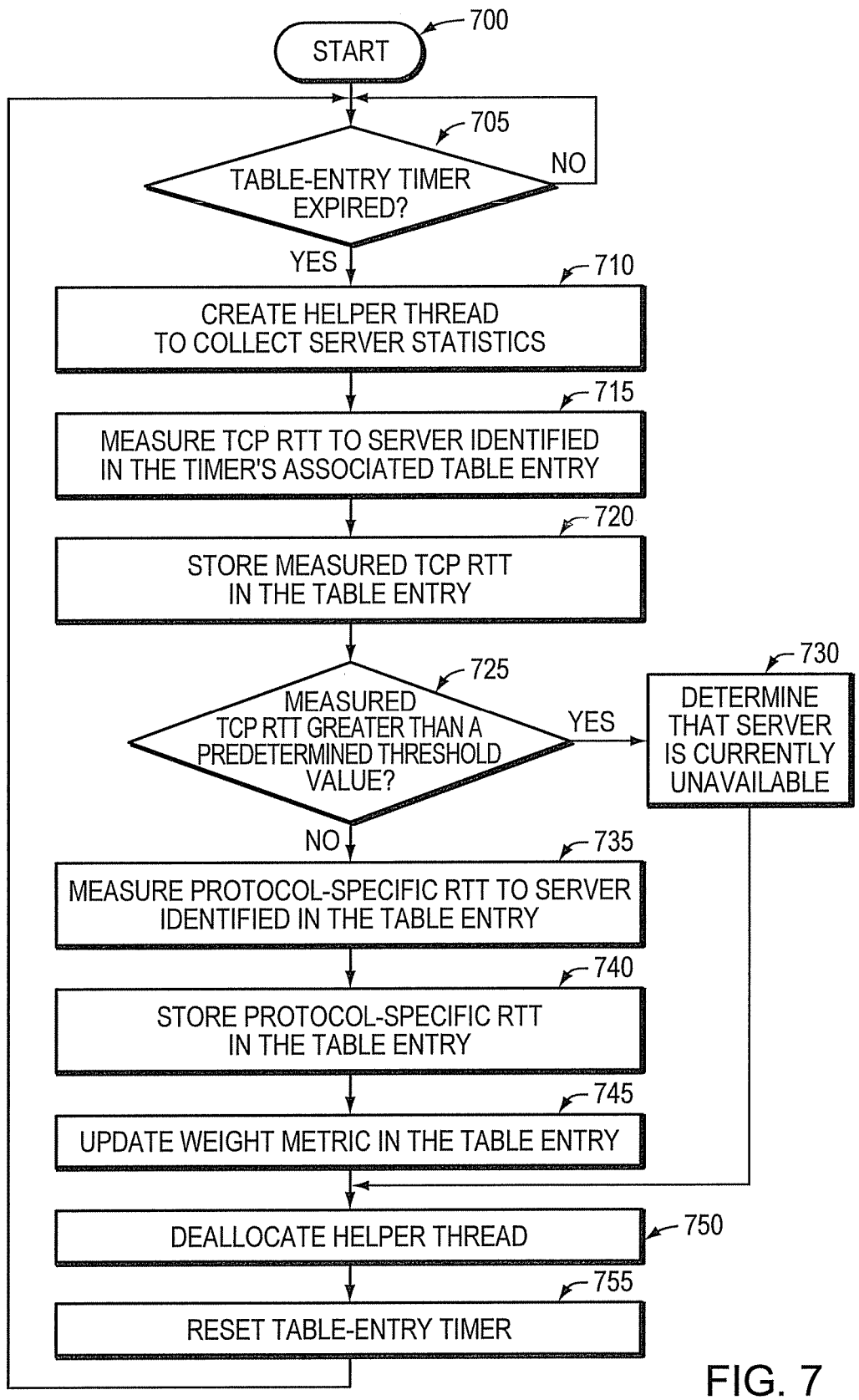
FIG. 7 is a flowchart illustrating a sequence of steps that may be performed for monitoring servers in accordance with the illustrative embodiment.

FIG. 7 illustrates a sequence of steps that may be performed by the server-monitoring thread 510 (and helper thread 512) in accordance with the present invention. The sequence starts at step 700 and advances to step 705 where the server-monitoring thread determines whether a table-entry timer 514 has expired. If not, the sequence returns to step 705 until a timer has expired. Otherwise, the sequence proceeds to step 710 where the server monitoring thread creates a helper thread 512 that updates the contents of the table entry 410 associated with the expired timer. To that end, the helper thread is configured to collect server statistics, such as TCP and protocol-specific RTT measurements 420 and 422, and is further configured to update the contents of the table entry based on the collected server statistics.

At step 715, the helper thread 512 sends a conventional TCP SYN packet to the server 414 identified in the expired timer's associated table entry. Then, the TCP RTT is measured as the amount of time that it takes for the server to return a TCP ACK message in response to the TCP SYN packet. The helper thread stores the measured TCP RTT value 420 in the expired timer's table entry, at step 720. Next, at step 725, the server-monitoring thread determines whether the measured TCP RTT value is greater than a predetermined threshold value. If so, then at step 730 the server 414 is determined to be currently unavailable, i.e., since it took an excessive amount of time to respond to the TCP SYN packet, if it responded at all; the sequence advances to step 750.

If, at step 725, the measured TCP RTT value is less than or equal to the predetermined threshold value, then at step 735 the helper thread 512 measures a protocol-specific RTT for the server 414. The protocol-specific RTT is measured as the amount of time that it takes for the server to respond to a protocol-specific message. At step 740, the helper thread stores the protocol-specific RTT value 422 in the expired timer's associated table entry 410. Then, at step 745, the helper thread inputs the measured TCP and protocol-specific RTT measurements into a weight function 424 identified in the table entry. The weight function outputs a weight metric 426 which the helper thread stores in the table entry. At step 750, the helper thread is deallocated or otherwise rendered inactive. The expired table-entry timer 514 is reset at step 755 and then the sequence returns to step 705.

Figure 8:
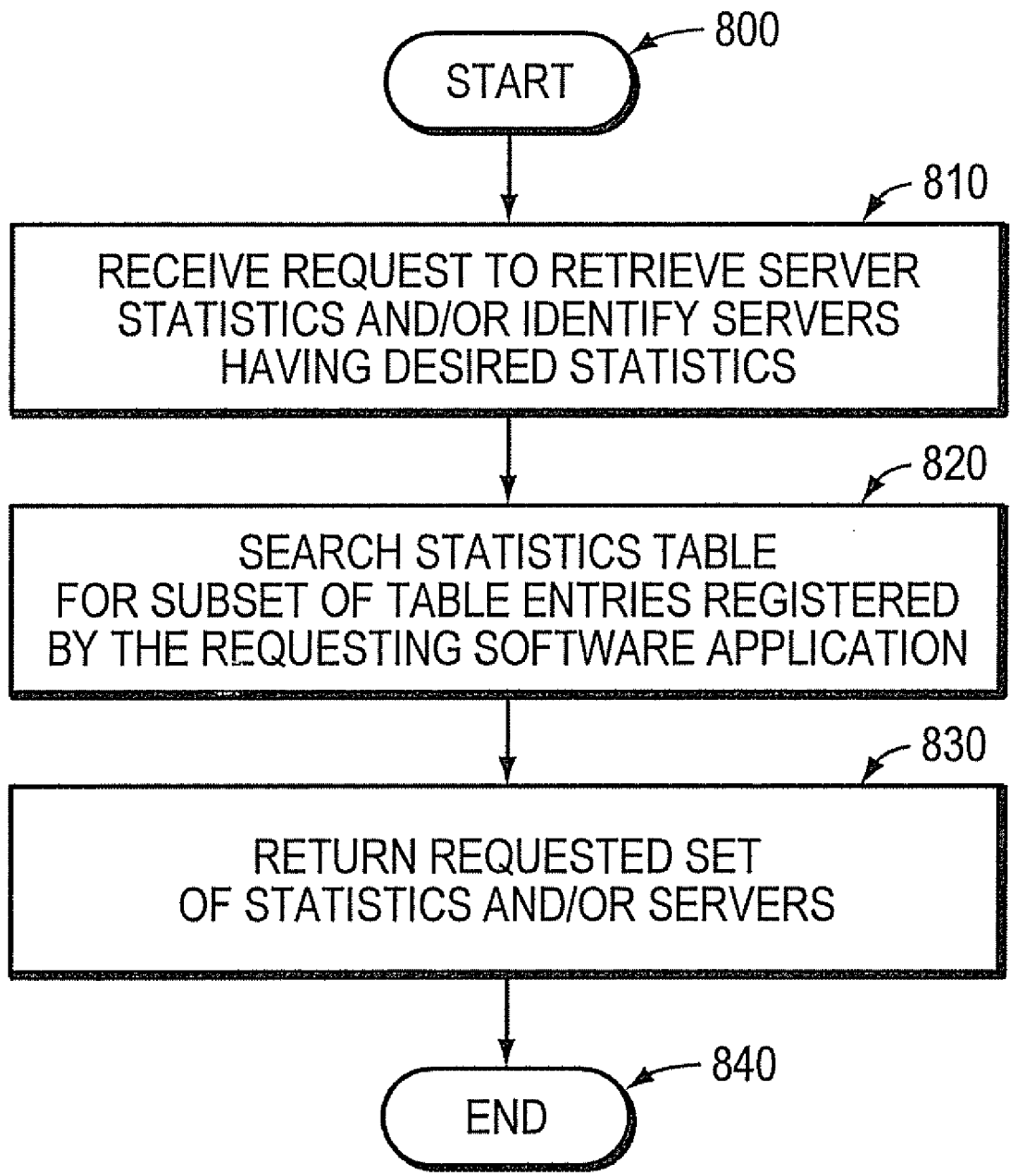
FIG. 8 is a flowchart illustrating a sequence of steps that may be performed for retrieving server statistics or other information from the statistics table in accordance with the illustrative embodiment.

FIG. 8 illustrates a sequence of steps that may be performed by the API 520 for retrieving server statistics or other information from the statistics table 400. The sequence starts at step 800 and proceeds to step 810 where the API receives a software module's request to retrieve server statistics and/or identify a set of servers whose statistics satisfy predetermined search criteria. The request may be in the form of an API function call, such as a get_weight or get_best_weight function call. At step 820, the API searches the statistics table 400 to locate a subset of table entries 410 containing software-module identifiers 412 matching the software-module identifier associated with the requesting user or software module. After locating the subset of matching table entries, the API 520 searches the subset of table entries to identify table entries containing the requested server statistics and/or satisfying the predetermined search criteria. At step 830, the requested set of server statistics and/or server identifiers is returned to the requesting software module. The sequence ends at step 840.

The foregoing description has been directed to particular embodiments of this invention. It will be apparent, however, that other variations and modifications may be made to the described embodiments, with the attainment of some or all of their advantages. For instance, although the novel software framework is illustratively deployed in a network cache 200, it is also expressly contemplated that the inventive framework may be implemented in other types of computer systems and network devices. Additionally, the novel software framework may be configured to monitor server statistics corresponding to remote servers, such as the exemplary servers 140-170, as well as local servers, e.g., executing within the network cache 200. In other words, at least one of the plurality of software modules executing in the network cache may be configured to register a server 414 for the server-monitoring thread 510 to monitor, such that the registered server is also executing in the network cache.

In the illustrative embodiment, the server-monitoring thread 510 is configured to periodically update server statistics for each server registered in the statistics table 400. It is further contemplated that, in alternative embodiments, the server-monitoring thread may update at least some of the table entries 410 on a non-periodic basis. Furthermore, although each table entry is illustratively associated with a separate table-entry timer 514, those skilled in the art will understand that a single table-entry timer may be associated with multiple table entries 410. For instance, suppose a single timer 514 is associated with the table entries 410a and 410b. In this case, when the timer 514 expires, a pair of helper threads 512 may be concurrently instantiated for updating server statistics and other information stored in the table entries 410a and 410b. Although the statistics table 400 is preferably organized in tabular form, those skilled in the art will appreciate that the table 400 may be implemented using various types of data structures, including but not limited to conventional tree structures, linked lists, hash tables and so forth.

It is expressly contemplated that the weight functions 424 stored in the statistics table 400 may correspond to any type of predetermined mathematical function, including both linear and non-linear functions. More generally, the weight functions may employ any technique that generates one or more weight metrics 426 based on at least one measured server statistic. For example, a weight function may be implemented as a lookup table that maps measured TCP and/or protocol-specific RTT values 420 and 422 to equivalent weight metrics 426. When a software module requests the API 520 to search the statistics table 400 for registered servers meeting predetermined search criteria, the API may be configured to issue an error message if it cannot locate any servers satisfying the criteria.

The procedures, threads, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A computer system, comprising:
a processor to execute software of the computer system;
a memory coupled to the processor and adapted to store a data structure, the data structure configured to store statistics associated with a plurality of servers coupled to the computer system, the data structure accessible by the processor, the data structure accessible by the plurality of servers, and different servers of the plurality of servers executing different protocols;
a server-monitoring thread of the software configured to update at least some of the statistics stored in the data structure, the server-monitoring thread to execute as a user-level process and be protocol independent, the server monitoring thread to monitor the plurality of servers, so that a fault occurring on a first server of the plurality of servers is processed by the software without causing an operating system of the processor to experience a fault.

2. The computer system as in claim 1, further comprising:
the server-monitoring thread is coded outside of a kernel-level protocol engine.

3. The computer system as in claim 1, further comprising:
the server monitoring thread measures a connection based round trip time for a particular server.

4. The computer system as in claim 1, further comprising:
the server monitoring thread measures a protocol specific round trip time for a particular server.

5. The computer system as in claim 1, further comprising:
a process to derive a weight metric representative of the relative availability of a server, and to store the metric in an entry for the server in the data structure.

6. The computer system as in claim 1, further comprising:
an application programming interface (API) responsive to a plurality of software modules executing in the computer system, the API configured to process requests from the plurality of software modules for (i) adding or removing servers in the data structure or (ii) accessing statistics from the data structure.

7. The computer system as in claim 1, further comprising:
the server monitoring thread may be restarted without affecting an underlying operating system.

8. The computer system as in claim 1, further comprising:
the software executing in a network cache, the network cache holding copies of files requested by client computers from the plurality of servers, individual ones of the servers using different protocol types.

9. The computer system as in claim 1, further comprising:
the data structure holding entries containing information concerning the plurality of servers.

10. The computer system as in claim 1, further comprising:
the software executing in a network cache, the network cache holding copies of files requested by client computers from the plurality of servers, individual ones of the servers using different protocol types; and
a process to select an optimal server from a plurality of servers of the same protocol type when a requested file is not found in the cache and is then obtained from an origin server.

11. The computer system as in claim 1, further comprising:
the software operates as a framework through which multiple software modules can register the plurality of servers (registered servers), and can monitor and access statistical information associated with the registered servers.

12. The computer system as in claim 1, further comprising:
the data structure has a plurality of entries, each entry configured to store statistics for a different server of the plurality of servers.

13. The computer system as in claim 1, further comprising:
the server-monitoring thread has a separate timer for each entry in the data structure, the server-monitoring thread being configured to update statistics stored in a data-structure entry when the timer associated with that data-structure entry expires.

14. The computer system as in claim 1, further comprising:
the server-monitoring thread has at least one helper thread for measuring statistics of a server of the plurality of servers and using the measured statistics to update the contents of a data-structure entry associated with that server.

15. The computer system as in claim 1, further comprising:
the server-monitoring thread is a user-level thread.

16. The computer system as in claim 1, further comprising:
the server-monitoring thread is capable of being debugged or restarted without affecting other threads and processes in the computer system.

17. The computer system as in claim 1, further comprising:
the processor is located in a network cache.

18. The computer system as in claim 1, further comprising:
the data structure is further configured to associate each of the plurality of servers with a corresponding one of a plurality of software modules.

19. The computer system as in claim 1, further comprising:
the data structure is configured to store a weight metric for each of the plurality of servers.

20. The computer system as in claim 19, further comprising:
each weight metric derived from at least one of a measured Transmission Control Protocol (TCP) round-trip time (RTT) and a measured protocol-specific RTT.

21. The computer system as in claim 1, further comprising:
an application programming interface (API) responsive to a plurality of software modules executing in the computer system is configured to search the data structure, in response to a request from a particular software module, to identify servers whose associated weight metrics satisfy predetermined search criteria.

22. The computer system as in claim 21, further comprising:
the predetermined search criteria instructs the API to identify which server registered in the data structure by the particular software module has the greatest or least weight metric value.

23. The computer system as in claim 1, further comprising:
the data structure is stored in a kernel memory, thereby eliminating context switching for kernel-level accesses to the data structure.

24. The computer system as in claim 1, further comprising:
the software executing in a first cache, the software to select an optimal higher level second cache based on the statistics stored in the data structure.

25. The computer system as in claim 1, further comprising:
the server-monitoring thread is used for a plurality of types of servers through an application programming interface (API).

26. The computer system as in claim 1, further comprising:
the processor to start the server-monitoring thread at bootup time.

27. The computer system as in claim 1, further comprising:
the processor to permit an operator to debug and to restart the server-monitoring thread without affecting the operating system.

28. The computer system as in claim 1, further comprising:
an application programming interface (API) responsive to the plurality of software modules executing in the computer system, the API configured to process requests from the plurality of software modules for adding and removing servers in the data structure.

29. The computer system as in claim 1, further comprising:
an application programming interface (API) responsive to the plurality of software modules executing in the computer system, the API configured to process requests from the plurality of software modules for accessing statistics from the data structure.

30. The computer system as in claim 1, further comprising:
receiving a data packet by a cache computer from a client, the data packet requesting information stored on one or more origin servers; and
determining by the cache computer if the information requested is stored on a storage device of the cache computer, and if the information is not stored on a storage device of the cache computer, selecting a higher level cache from the plurality of servers to supply the information requested.

31. The computer system as in claim 1, further comprising:
a storage device coupled to the computer system, the storage device to store information stored by a client computer of the computer system.

32. The computer system as in claim 31, further comprising:
a writable storage device used as the storage device.

33. The computer system as in claim 31, further comprising:
a magnetic disk drive used as the storage device.

34. The computer system as in claim 31, further comprising:
an optical disk drive used as the storage device.

35. The computer system as in claim 31, further comprising:
a non-volatile random access memory used as the storage device.

36. The computer system as in claim 31, further comprising:
a FLASH memory used as the storage device.

37. The computer system as in claim 31, further comprising:
an erasable programmable read-only memory (EPROM) used as the storage device.

38. The computer system as in claim 31, further comprising:
a magnetic or optical tape used as the storage device.

39. A method for operating a computer system, comprising:
executing software on a processor of the computer system;
configuring a data structure to store statistics associated with a plurality of servers coupled to the computer system, the data structure stored in a memory of the computer system, the data structure accessible by the processor, the data structure accessible by the plurality of servers, and different servers of the plurality of servers executing different protocols;
configuring a server-monitoring thread of the software to update at least some of the statistics stored in the data structure, the server-monitoring thread to execute as a user-level process and be protocol independent, the server monitoring thread to monitor the plurality of servers, so that a fault occurring on a first server of the plurality of servers is processed by the software without causing an operating system of the processor to experience a fault.

40. The method as in claim 39, further comprising:
coding the server-monitoring thread outside of a kernel-level protocol engine.

41. The method as in claim 39, further comprising:
measuring a connection based round trip time for a particular server by the server monitoring thread.

42. The method as in claim 39, further comprising:
measuring a protocol specific round trip time for a particular server by the server monitoring thread.

43. The method as in claim 39, further comprising:
deriving a weight metric representative of the relative availability of a selected server of the plurality of servers by a process, and storing the metric in an entry for the server in the data structure.

44. The method as in claim 39, further comprising:
processing requests from the plurality of software modules for (i) adding or removing servers in the data structure or (ii) accessing statistics from the data structure by application programming interface (API).

45. The method as in claim 39, further comprising:
restarting the server monitoring thread without affecting an underlying operating system.

46. The method as in claim 39, further comprising:
executing the software in a cache, the cache holding copies of files requested by client computers from the plurality of servers, individual ones of the servers using different protocol types.

47. The method as in claim 39, further comprising:
holding entries containing information concerning the plurality of servers by the data structure.

48. The method as in claim 39, further comprising:
executing the software in a network cache, the network cache holding copies of files requested by client computers from the plurality of servers, individual ones of the servers using different protocol types; and
a process to select an optimal server from a plurality of servers of the same protocol type when a requested file is not found in the cache and is then obtained from an origin server.

49. The method as in claim 39, further comprising:
operating the software as a framework through which multiple software modules can register the plurality of servers (registered servers), and can monitor and access statistical information associated with the registered servers.

50. The method as in claim 39, further comprising:
configuring a plurality of entries in the data structure, each entry configured to store statistics for a different server of the plurality of servers.

51. The method as in claim 39, further comprising:
updating statistics stored in a data-structure entry when a timer associated with that data-structure entry expires, the server-monitoring thread having a separate timer for each entry in the data structure.

52. The method as in claim 39, further comprising:
measuring statistics of a server of the plurality of servers by the server-monitoring thread with at least one helper thread, and using the measured statistics to update the contents of a data-structure entry associated with that server.

53. The method as in claim 39, further comprising:
using a user-level thread as the server-monitoring thread.

54. The method as in claim 39, further comprising:
debugging or restarting the server-monitoring thread without affecting other threads and processes in the computer system.

55. The method as in claim 39, further comprising:
locating the processor in a network cache.

56. The method as in claim 39, further comprising:
configuring the data structure to associate each of the plurality of servers with a corresponding one of a plurality of software modules.

57. The method as in claim 39, further comprising:
configuring the data structure to store a weight metric for each of the plurality of servers.

58. The method as in claim 57, further comprising:
deriving each weight metric from at least one of a measured Transmission Control Protocol (TCP) round-trip time (RTT) and a measured protocol-specific RTT.

59. The method as in claim 39, further comprising:
executing an application programming interface (API) responsive to a plurality of software modules to search the data structure, in response to a request from a particular software module, to identify servers whose associated weight metrics satisfy predetermined search criteria.

60. The method as in claim 59, further comprising:
instructing the API by the predetermined search criteria to identify which server registered in the data structure has the greatest or least weight metric value.

61. The method as in claim 39, further comprising:
storing the data structure in a kernel memory, thereby eliminating context switching for kernel-level accesses to the data structure.

62. The method as in claim 39, further comprising:
executing the software in a first cache, the software to select an optimal higher level second cache based on the statistics stored in the data structure.

63. The method as in claim 39, further comprising:
using the server-monitoring thread for a plurality of types of servers through an application programming interface (API).

64. The method as in claim 39, further comprising:
starting the server-monitoring thread at bootup time.

65. The method as in claim 39, further comprising:
permitting an operator to debug and to restart the server-monitoring thread without affecting an operating system.

66. The method as in claim 39, further comprising:
configuring an Application Programming Interface (API) to process requests from the plurality of software modules for adding and removing servers in the data structure.

67. The method as in claim 39, further comprising:
configuring an Application Programming Interface (API) to process requests from the plurality of software modules for accessing statistics from the data structure.

68. The method as in claim 39, further comprising:
receiving a data packet by a cache computer from a client, the data packet requesting information stored on one or more origin servers; and
determining by the cache computer if the information requested is stored on a storage device of the cache computer, and if the information is not stored on a storage device of the cache computer, selecting a higher level cache from the plurality of servers to supply the information requested.

69. The method as in claim 39, further comprising:
coupling a storage device to the computer system, the storage device to store information stored by a client computer of the computer system.

70. The method as in claim 69, further comprising:
using a writable storage device as the storage device.

71. The method as in claim 69, further comprising:
using a magnetic disk drive as the storage device.

72. The method as in claim 69, further comprising:
using an optical disk drive as the storage device.

73. The method as in claim 69, further comprising:
using a non-volatile random access memory as the storage device.

74. The method as in claim 69, further comprising:
using a FLASH memory as the storage device.

75. The method as in claim 69, further comprising:
using an erasable programmable read-only memory (EPROM) as the storage device.

76. The method as in claim 69, further comprising:
using a magnetic or optical tape as the storage device.

77. A computer readable non-transitory storage media, comprising:
said computer readable storage media containing program instructions for execution on a processor for a method of operating a computer system, the program instructions for,
executing software on a processor of the computer system;

configuring a data structure to store statistics associated with a plurality of servers coupled to the computer system, the data structure stored in a memory of the computer system, the data structure accessible by the processor, the data structure accessible by the plurality of servers, and different servers of the plurality of servers executing different protocols;

configuring a server-monitoring thread of the software to update at least some of the statistics stored in the data structure, the server-monitoring thread to execute as a user-level process and be protocol independent, the server monitoring thread to monitor the plurality of servers, so that a fault occurring on a first server of the plurality of servers is processed by the software without causing an operating system of the processor to experience a fault.

* * * * *

UNITED STATES PATENT AND TRADEMARK OFFICE
CERTIFICATE OF CORRECTION

Page 1 of 1

PATENT NO.        : 8,028,056 B1
APPLICATION NO.   : 12/633296
DATED             : September 27, 2011
INVENTOR(S)       : Ravi Krishna et al.

It is certified that error appears in the above-identified patent and that said Letters Patent is hereby corrected as shown below:

Title page, item [57] replace the abstract as follows:

A software framework configured to execute in a computer system and adapted to monitor statistics associated with one or more servers coupled to the computer system is disclosed. A data structure is configured to store statistics associated with the one or more servers coupled to the computer system. A server-monitoring thread is configured to update at least some of the statistics stored in the data structure, the server-monitoring thread to execute on a processor of the computer system. An application programming interface (API) responsive to a plurality of software modules executes in the computer system, the API is configured to process requests from the plurality of software modules for (i) adding or removing servers in the data structure or (ii) accessing statistics from the data structure. The computer system may be a network cache.

Signed and Sealed this
First Day of May, 2012

David J. Kappos
*Director of the United States Patent and Trademark Office*